(12) United States Patent
Kurtz et al.

(10) Patent No.: US 6,206,199 B1
(45) Date of Patent: Mar. 27, 2001

(54) METHOD AND AN APPARATUS FOR RECYCLING DIFFERENT COMPONENTS IN A MULTIPLE LAYER MATERIAL

(75) Inventors: Rudolf Kurtz, Huskvarna (SE); Günter Betz, Brittnau (CH)

(73) Assignee: Cellwood Machinery AB, Nassjo (SE)

( * ) Notice: Subject to any disclaimer, the term of this patent is extended or adjusted under 35 U.S.C. 154(b) by 0 days.

(21) Appl. No.: 09/202,819

(22) PCT Filed: Jun. 17, 1997

(86) PCT No.: PCT/SE97/01076

§ 371 Date: Aug. 30, 1999

§ 102(e) Date: Aug. 30, 1999

(87) PCT Pub. No.: WO97/49494

PCT Pub. Date: Dec. 31, 1997

(30) Foreign Application Priority Data

Jun. 24, 1996 (SE) .................................................. 9602481

(51) Int. Cl.⁷ ...................................................... B03B 1/00
(52) U.S. Cl. ...................... 209/3; 209/4; 209/7; 209/9; 209/11; 209/17; 209/270; 209/284; 209/285; 209/288; 209/293; 209/294; 209/296; 209/297
(58) Field of Search ............................. 241/259.1, 24.18, 241/24.19, 79; 209/3, 11, 4, 7, 9, 17, 270, 284, 285, 288, 293, 294, 296, 297

(56) References Cited

U.S. PATENT DOCUMENTS

| | | | |
|---|---|---|---|
| 1,629,377 | * | 5/1927 | Buckwalter . |
| 1,709,133 | * | 4/1929 | Kerr et al. . |
| 1,712,258 | * | 5/1929 | Compain . |
| 2,286,132 | * | 6/1942 | Walle ........................ 209/6 |
| 2,942,731 | * | 6/1960 | Soldini ..................... 209/293 |
| 3,113,733 | * | 12/1963 | Carlson ..................... 241/68 |
| 3,283,792 | * | 11/1966 | Thomas .................... 146/192 |
| 3,815,835 | * | 6/1974 | Apostol et al. ............ 241/188 |
| 4,083,499 | * | 4/1978 | Thatcher ..................... 241/24 |
| 4,251,034 | * | 2/1981 | Corr et al. ................. 241/14 |
| 4,500,040 | * | 2/1985 | Steffens ..................... 241/14 |
| 4,538,767 | * | 9/1985 | Pimley ..................... 241/79.3 |
| 5,042,726 | * | 8/1991 | Reinhall .................... 241/28 |
| 5,181,617 | * | 1/1993 | Lehrmann .................. 209/31 |
| 5,255,859 | * | 10/1993 | Peacock et al. .......... 241/79.1 |
| 5,277,758 | * | 1/1994 | Brooks ..................... 162/4 |
| 5,292,075 | * | 3/1994 | Bartlett ...................... 241/20 |
| 5,618,003 | * | 4/1997 | Akiyoshi et al. .......... 241/19 |
| 5,848,754 | * | 12/1998 | Becker et al. ............ 241/24.16 |
| 5,887,805 | * | 3/1999 | Chapman .................. 241/24.13 |

FOREIGN PATENT DOCUMENTS

| | | | | |
|---|---|---|---|---|
| 0249370 | * | 9/1987 | (DD) ..................... 241/24.18 |
| 581089 | * | 2/1994 | (EP) ..................... 241/24.18 |
| 383 006 | | 2/1976 | (SE) . |
| 417 623 | | 3/1981 | (SE) . |
| 1814922 | * | 5/1993 | (SU) ......................... 241/79 |
| 92018991 | * | 10/1992 | (WO) ................... 241/24.18 |

* cited by examiner

Primary Examiner—Donald P. Walsh
Assistant Examiner—David Jones
(74) Attorney, Agent, or Firm—Sughrue, Mion, Zinn, Macpeak & Seas, PLLC

(57) ABSTRACT

In order to recover the various components of multiple layer materials, a method uses a refiner or disperser including mutually opposing rotating discs having material engaging surfaces or elements such as teeth. The method includes: adjusting a gap between the discs so that a material is subjected to a shear force that mutually separates its material layers in the form of pieces or fragments in the absence of any substantial disintegration of the layers; pumping the separated pieces of the various layers together with a supplied suspension liquid to a separator; and, separating readily pulped or slushed pieces of the material suspended in the suspension liquid from pieces of the suspended material that are not readily pulped or slushed. The pumping of the separated pieces and suspension liquid to the separator can be via a collection vessel.

21 Claims, 1 Drawing Sheet

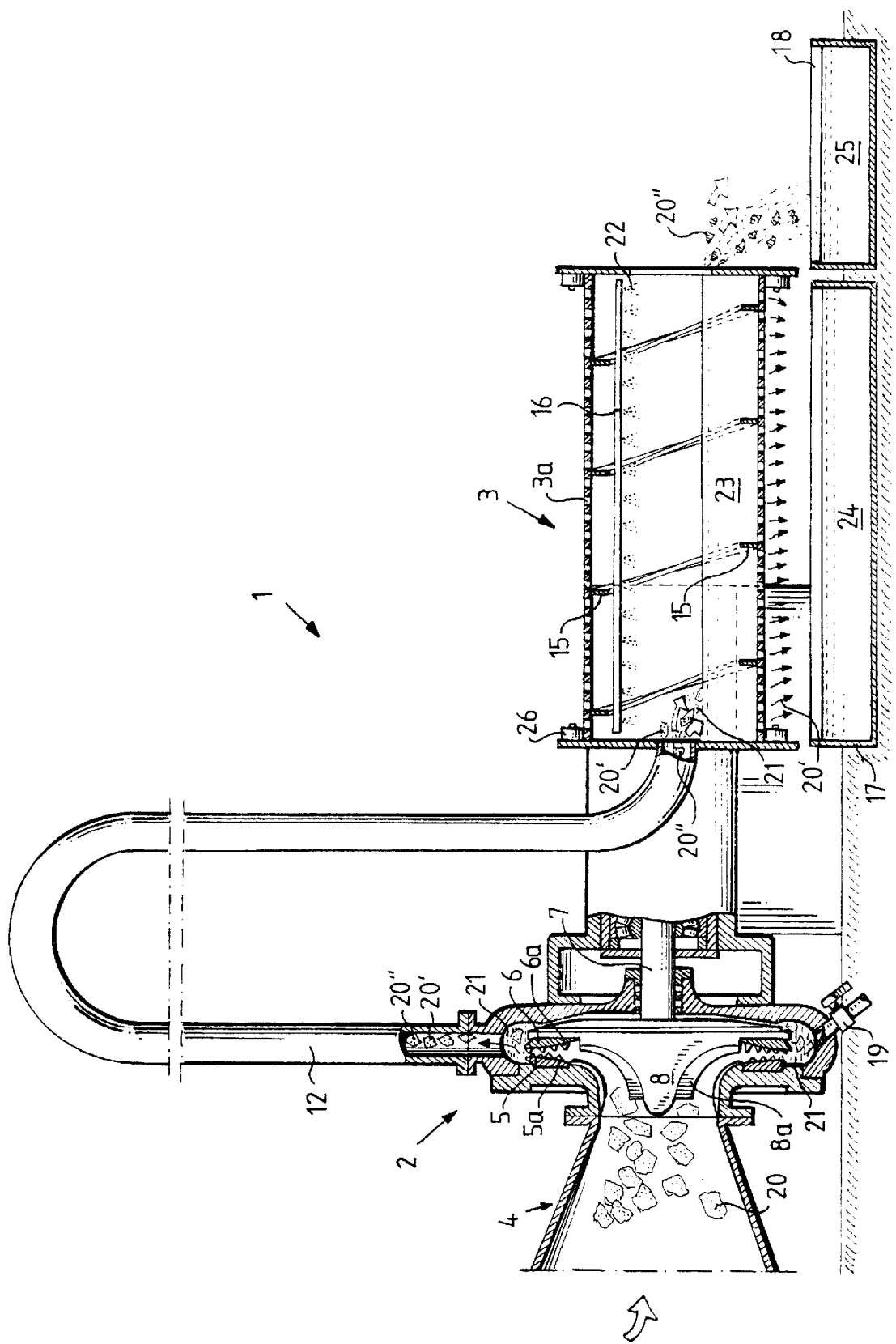

METHOD AND AN APPARATUS FOR RECYCLING DIFFERENT COMPONENTS IN A MULTIPLE LAYER MATERIAL

FIELD OF INVENTION

The present invention relates to a method of recovering the various components of multiple layer materials, such as materials that consist of paper, plastic and aluminium foil, and more specifically to a method applicable to a refiner or disperser having mutually opposing discs that rotate relative to one another and that have material engaging surfaces or material engaging elements.

The invention also relates to a plant for recovering such components.

Handling of material, e.g. multiple layer material, for recycling purposes entails comparatively high costs in transporting the material to a recovery plant. For this reason it is unrealistic to expect that the actual recovery plant can have a very large capacity. This would mean that the capital cost of the actual recovery plant would be so high as to cause a large recovery area with correspondingly high transport costs from peripheral parts thereof to exceed the processing value of the product obtained in the recovery plant. This recovered product shall subsequently constitute one of several different starting materials for subsequent manufacturing processes or refinement processes.

Consequently a plurality of recovery plants that have somewhat limited capacity and that serve a not unduly large recovery area can therefore be expected to show the highest returns from an economic aspect.

BACKGROUND OF THE INVENTION

Recovery of the components of multiple layer materials, for instance recovery of paper, plastic and aluminium foil from beverage packaging materials, has earlier been achieved with the aid of large drum pulpers or traditional pulpers, to which chemicals are normally added. Such large plants incur heavy investment costs, require large construction and installation areas, and consume large amounts of energy, which explains why such plants have not been used more widely.

SE,B,417 623 (Escher Wyss) discloses a method in which particles processed in a disperser are rolled to form small compact grains. The known method requires comprehensive treatment of the material upstream of the disperser and is therefore expensive and highly energy consuming.

SE,B,383 006 (Munksjö) described a method of recovering fibers from waste paper with the aid of a rotatable perforated drum provided with lifting means. The document is not concerned with layer separation of waste material.

OBJECTS OF THE INVENTION

An object of the present invention is to provide a method and processing plant of the aforedescribed kind which will enable the components of multiple layer materials to be separated effectively without consuming large quantities of energy, and which will enable said components to be handled and recovered for further processing in a comparatively simple manner.

Another object of the invention is to provide a method and processing plant of the aforesaid kind that will enable the components of multiple layer materials to be also recovered economically in plants of comparatively limited capacity.

SUMMARY OF THE INVENTION

These and other objects are fulfilled with an inventive method.

The invention is based on the discovery that the components of multiple layer material can be separated effectively by subjecting adjacent layers to shear forces that loosen the various layers from one another without needing to subject the layers to any substantial degree of disintegration in conjunction with the layer-shearing or layer-separating operation.

Thus, there are obtained pieces or fragments of the various components that may have a more or less regular shape or a totally irregular shape.

The size of the layers of material loosened by friction may thus be in the order of an A4-size or smaller.

It is often of value to recover primarily paper from multiple layer material. However, application of the inventive method will also make the recovery of other components of the material, such as aluminium and plastic for instance, also economically justifiable.

Recovery of the paper present in such materials can be facilitated by slushing or defibering the paper to some extent in conjunction with or in connection with releasing or loosening the layers in said material. This paper slushing or suspending process can be continued and amplified in a following treatment stage.

Separation of the layers by shearing action can be made effective by using discs of different constructions in accordance with the nature of the starting material concerned, said discs being arranged to rotate relative to one another.

In some cases it is sufficient for the discs to have comparatively smooth or planar surfaces, wherewith the friction to which the material is subjected when in engagement with the discs is sufficient to produce the shearing effect desired.

In other cases, different types of engagement elements, such as teeth, bars, grooves, serrations or like elements, are required on one or both discs in order to ensure that the intended layer separation effect is achieved.

One significant factor that determines which disc construction shall be used is the thickness of the multiple layer material and the width of the gap between the discs. The width of the gap can be varied, for instance so as to decrease radially and thus have the smallest value in the peripheral region of the discs.

The state of the material supplied is also significant to the result of the layer shearing or layer separating operation.

The properties of a multiple layer material that has been moistened upstream of the infeed zone of the refiner or in said infeed zone and/or that has been heated, for instance with steam, will be different to material that is supplied to the infeed zone in a dry state. Those parameters that have an effect on the result of the operation in conjunction with the actual layer shearing operation include the construction of the disc surfaces or of the disc-carried material engaging elements, the size of the gap width, the speed at which the discs rotate, the amount of dilution liquid or suspension liquid supplied, and so on.

Upon completion of the layer separating or layer shearing operation, the various layers are pumped together with the dilution liquid added to the process optionally to a collecting vessel which may, in certain cases, be suitable in order to equalize variations in flow from the refiner.

The provision of such a collecting vessel will not be necessary in certain cases, and the separated pieces of material present in the dilution liquid can be pumped directly to a separator in which readily suspended or slushed material layers in the suspension liquid are removed separately from material layers that are not readily slushed.

Pumping of separated material layers taken-up in the suspension liquid is suitably effected against a generated counter-pressure. Trials have shown that the use of a valve or valves in order to generate this counterpressure is impractical, because of the risk of the valve or valves becoming clogged by the separated pieces of material. Instead, the counter-pressure is suitably generated by taking-up the pieces of material and the suspension liquid in a conduit, suitably a U-shaped conduit, which is extended to a given level above the refiner acting as a pump.

The final separation stage is effected by delivering the separated pieces of material present in the suspension liquid—optionally via a collecting vessel of the aforesaid kind—in the form of a pulp suspension to a generally horizontal, rotating, perforated drum that includes an internal screw feeder. Additional suspension or dilution liquid is supplied to the drum, preferably sprayed thereinto from the upper part of the drum. Those layers of material that are able to pass into suspension, e.g. relatively finely-divided pieces of paper, are able to depart through the perforations, whereas those material layers that cannot readily pass into suspension, such as pieces of aluminium and plastic, are fed out of the drum at one end by the screw feeder. Suitably constructed vessels for receiving the different materials and the suspension liquid are suitably provided beneath the drum.

Final separation of metal pieces, e.g. aluminium pieces from the normally larger plastic pieces may be effected in a known manner, e.g. with the aid of the force of gravity.

In order to ensure that pieces of metal, e.g. aluminium, and plastic separated from the paper pieces are not disintegrated to the same extent as said paper pieces, the size of the gap may be adapted so that the pieces of metal and plastic will have a size suitably smaller than an A4-size, for instance a size of up to 30–40 mm subsequent to separation. The shape of the separated pieces, however, will normally vary greatly.

One particular advantage afforded by the inventive method is that separation can normally be effected without the addition of chemicals, and is therewith beneficial from an environmental aspect. When certain particular materials are to be separated with the aid of the invention, improved effectiveness can be achieved by adding chemicals suitable for the purpose intended.

Another advantage afforded by the invention is that the introductory separation of the layers of a multiple layer material takes place very quickly in practice, therewith facilitating pulping or slushing of the separated paper in a subsequent process.

According to another aspect, the invention also relates to recovery plant for recovering different components of multiple layer materials, for instance material that consists of paper, plastic and aluminium foil, the main characteristic features of the plant being set forth in claim 6.

Further characteristic features of the inventive method and the inventive plant will be apparent from the following description of an exemplary embodiment thereof. The description is given with reference to the accompanying drawing which is a partially sectioned side view of some main parts of an inventive plant.

DETAILED DESCRIPTION OF A PREFERRED EMBODIMENT

The drawing shows a recovery plant 1 for recovering various components from multiple layer materials, for instance materials that consist of paper, plastic and aluminium foil. The plant includes two main parts, namely a refiner or disperser 2 which is adapted to separate readily slushed layers of material from layers that are not readily slushed by means of a shearing operation, and a generally horizontal, rotatable, perforated drum 3 that includes an internal screw feeder and to which separated pieces of the various material layers are delivered together with suspension liquid. Readily slushed material taken-up by the suspension liquid and separated from less readily slushed layer material are removed from the drum.

The refiner or disperser 2 includes an outwardly flared or funnel-shaped infeed zone 4 that adjoins a housing in which a fixed disc or stator disc 5 and a rotatable disc or rotor disc 6 are mounted. The horizontal rotor shaft is referenced 7 and carries at one end the aforesaid rotor 8, which has the form of an impeller provided with blades or vanes 8a. The two discs 5, 6 define therebetween a gap whose width or depth can be adjusted, by displacing the rotor shaft 7 with the aid of an hydraulic device mounted in the rotor shaft casing in a manner not shown. The gap between the discs is adjusted so that the material introduced through the infeed zone 4 will be subjected to shear forces as the rotor disc 6 rotates relative to the stator disc 5. These shear forces mutually separate the component layers of the multilayer material.

In the illustrated embodiment, both discs 5 and 6 include material engaging elements in the form of teeth 5a and 6a respectively. Other types of engagement elements may alternatively be used, or one or both disc surfaces may be smooth.

Suspension liquid 21 is delivered to the pump housing through a delivery pipe that includes a tap 19, wherewith readily slushed material pieces 20', in the illustrated case shredded or essentially whole paper pieces, are separated in the pump housing from pieces of material 20" that are more difficult to slush or suspend, e.g. material pieces that consist of aluminium layers coated with plastic foil.

The pumping action generated by the pump rotor 8 creates a subpressure in the infeed zone 4 where the multiple layer material is delivered in the form of pieces 20. The multiple layer material may be delivered to the infeed zone with the aid of an appropriate conveyer, or may be blown thereinto with the aid of a blower.

In an alternative embodiment, the rotor shaft 7 is vertical and the force of gravity may be used to simply hold the pieces 20 of multiple layer material down in the infeed zone 4.

Prior to being delivered to the infeed zone 4, the pieces of material 20 may be pre-treated, e.g. moistened with water and/or heated, e.g. steam heated, such as to facilitate the aforedescribed frictional separation of the layers in accordance with the properties of the multiple layer material being treated.

The refiner or disperser 2 quickly separates different layers one from the other, so as to facilitate pulping or slushing of paper in a subsequent process.

The suspension of separated pieces 20' and 20" is pumped against a counterpressure. This is achieved in the illustrated embodiment with the aid of a U-shaped conduit 12. The conduit 12 may have a height of about 15 m, so as to generate a counterpressure of 1.5 bar.

Alternatively, a rubber hose of shorter length may be used, and the desired counterpressure generated through the medium of one or more constrictions. These constrictions may be obtained by necking-in the hose with the aid of ties. It is also feasible in principle to provide the conduit 12 or the hose with one or more throttle valves. However, the valves used in this latter alternative are liable to become clogged.

As beforementioned, the conduit 12 or a corresponding hose optionally provided with constrictions or throttled regions opens into a collecting vessel (not shown) for receiving the suspension in question. The use of such a vessel will ensure the continuity of the separation process, even when the delivery of multiple layer material to the infeed zone is relatively uneven. The pieces of material 20' suspended in the suspension liquid may also be further disintegrated in such a vessel, thereby enabling subsequent treatment of the material in the drum 3 to be carried out more simply and more quickly.

In the illustrated case, however, the conduit 12 opens into the drum 3. The drum includes a generally horizontal shaft which is provided with perforations 3a and is carried and slowly rotated by wheels 26 that engage the periphery of the drum.

Mounted in the drum is a horizontal screw feeder 15 whose height corresponds to 10–20% of the drum radius. Also mounted in the drum is a sprinkler system in the form of a pipe 16 that includes nozzles by means of which additional liquid, preferably water, can be delivered to the suspension in the drum interior.

Finely divided, readily slushed material comprising chiefly of water-suspended paper fibers 20' are able to depart down through the perforations 3a in the drum under the force of gravity, and are collected in an underlying vessel 17 and recovered for use in paper manufacture.

The material layers 20" that are more difficult to slush or pulp are conveyed axially by the screw feeder 15 and depart from that end of the drum remote from the conduit 12, and collected in the form of a material-liquid mixture 25 in a vessel 18. The components of these pieces of material 20", such as aluminium and plastic for instance, can be further separated if so desired and then utilized individually in some suitable way.

The perforations 3a in the drum 3 may have a diameter of 20 mm, therewith enabling pulp pieces in the liquid suspension having a size smaller than 20 mm to pass down into the vessel 17.

The suspension may have a pulp consistency of some 4–8% for instance, which thus means that a relatively large volume of water 21 and 22 must be supplied via the devices 19 and 16.

A plant constructed in accordance with the invention is suitably adapted for continual operation and can have a high capacity despite its relatively small dimensions. Trials have shown that the mechanical shear process to which the material is subjected can be achieved with an energy consumption in the order of 30 Kwh per ton. The energy consumption required by the shearing process undertaken according to the document to Escher Wyss is three times as great, according to the values given in said document.

What is claimed is:

1. A method of recovering different components of a multiple layer material (20) delivered to an infeed zone (4) of a refiner (2) that includes mutually opposing discs (5, 6) which rotate relative to one another and which include material engaging surfaces or material engaging elements (5a, 6a), the method comprising:
    a) adjusting a gap between the discs (5, 6) so that the multiple layer material (20) is subjected to a shear force that separates the material layers into a form of pieces or fragments without substantially disintegrating the layers; and
    b) pumping the separated pieces (20'; 20") together with a supplied suspension liquid (21) to a separator (3) and separating readily pulped or slushed pieces (20') suspended in the suspension liquid from pieces of material (20") that are not readily pulped or slushed.

2. A method according to claim 1, wherein the pumping of the separated material layers suspended in the suspension liquid is effected against a counterpressure by blades or vanes (8a) mounted on a rotor disc (6) of the discs of the refiner (2).

3. A method according to claim 1, further comprising:
    c) delivering the mutually separated material layers (20', 20") suspended in the suspension liquid (21) to a generally horizontal, rotating, perforated drum (3) to which further suspension liquid (22) is supplied, so that the readily slushed or pulped pieces of material (20') depart through perforations (3a) and the not-readily slushed or pulped pieces of material (20") are discharged through one end of the drum with the aid of a screw feeder (15) mounted in the drum.

4. A method according to any one of claims 1–3, 10, and 11, further comprising pre-treating the multiple layer material (20) by at least one of moistening and heating the multiple layer material, in the infeed zone (4) or prior to delivering the multiple layer material to the infeed zone.

5. A method according to claim 2, wherein the pumping generates counterpressure, in one of a hose and a conduit that connects an outlet of the refiner with an inlet of the separator, in the absence of valves.

6. A recovery plant for recovering different components of a multiple layer material, comprising:
    a) a refiner (2) that includes an infeed zone (4), the refiner comprising:
        a housing which accommodates mutually opposing discs (5, 6) that include at least one of material engagement surfaces and material engagement elements means for rotating one disc (6) relative to the other (5); means (21) for delivering suspension liquid to the housing; a rotor (8) that includes pump blades or vanes (8a), and one of a hose and a conduit (12), for pumping layer material that has been separated between the discs by shearing action; and
        means for varying a distance between the discs (5, 6) so that the multiple layer material is separated in the form of material pieces or fragments without causing substantial disintegration; and
    b) a separator (3) operative to receive the separated layer material and remove readily pulped or slushed pieces of material (20') suspended in a suspension liquid (21) separately from pieces of material (20") that are not readily slushed or pulped.

7. A plant according to claim 6, wherein the one of the hose and conduit (12) is adapted to generate a counterpressure to the pump pressure, generated by the pump vanes or blades, without utilizing throttle valves that impede the flow of material.

8. A plant according to claim 6 wherein the separator includes means for supplying additional suspension liquid to the material suspension.

9. A plant according to any one of claims 6–8, further comprising:
    a collecting vessel (17) provided beneath the separator for collecting a suspension of readily pulped layer material (24); and
    a vessel (18) provided in the region of an outfeed end of the separator for collecting a suspension (25) of layer material that is not readily slushed or pulped.

10. A method according to claim 1, wherein the pumping of the suspended separated pieces to the separator is via a collecting vessel.

11. A method according to claim 3, wherein the further suspension liquid (22) is supplied by spraying.

12. A method according to claim 4, wherein the pretreating is done by steaming.

13. A method according to claim 1, wherein the adjusting of the gap between discs is modulated.

14. A method according to claim 13, wherein the modulation optimizes the shear force according to at least one of a type of layering, a type of component, a rotational speed of the discs, an amount of counterpressure against the pumping, and a rate of the delivery of the multiple layer material.

15. A method according to claim 1, wherein the adjustment of the gap is modulated based on an efficiency of the separating.

16. A method according to claim 15, wherein the modulation of the adjustment is controlled to change the shear force.

17. A method according to claim 1, wherein the pumping of the separated material layers suspended in the suspension liquid is effected against an adjustable counterpressure, the method further comprising controlling an adjusting of the counterpressure while controlling the adjusting of the gap between the discs.

18. A plant according to claim 6, wherein the separator (3) receives the separated multiple layer material via a collection vessel.

19. A plant according to claim 8, wherein the means for supplying additional suspension liquid comprises a conduit (22) provided with spray nozzles.

20. A plant according to claim 8, wherein the means for supplying additional suspension liquid comprises a conduit (22) provided with spray nozzles.

21. A plant according to claim 6, wherein the separator comprises a drum having mounted therein a screw feeder (15) for discharging layer material (20") that is not readily pulped or slushed through one end of the drum, while readily pulped or slushed layer material (20') departs through perforations (3a) in the drum periphery.

* * * * *